United States Patent
Sojoodi et al.

(10) Patent No.: US 9,307,342 B2
(45) Date of Patent: Apr. 5, 2016

(54) DYNAMIC RENDERING FOR SOFTWARE APPLICATIONS

(71) Applicant: Pivotal Software, Inc., Palo Alto, CA (US)

(72) Inventors: Sina Sojoodi, Toronto (CA); Joshua Winters, Toronto (CA); Elliott Garcea, Toronto (CA); Dwayne Forde, Toronto (CA); Mark D'Cunha, Brampton (CA)

(73) Assignee: Pivotal Software, Inc., Palo Alto, CA (US)

( * ) Notice: Subject to any disclaimer, the term of this patent is extended or adjusted under 35 U.S.C. 154(b) by 22 days.

(21) Appl. No.: 14/276,076

(22) Filed: May 13, 2014

(65) Prior Publication Data

US 2014/0337414 A1   Nov. 13, 2014

Related U.S. Application Data

(60) Provisional application No. 61/855,281, filed on May 13, 2013.

(51) Int. Cl.
*H04L 29/08* (2006.01)
*H04W 4/00* (2009.01)

(52) U.S. Cl.
CPC ............... *H04W 4/003* (2013.01); *H04L 67/02* (2013.01)

(58) Field of Classification Search
CPC ........................... G06F 3/04847; G06F 3/0481
USPC .................. 709/203; 715/223, 760, 735, 736
See application file for complete search history.

(56) References Cited

U.S. PATENT DOCUMENTS

| | | | |
|---|---|---|---|
| 6,066,181 A | 5/2000 | DeMaster | |
| 2002/0111995 A1 | 8/2002 | Mansour et al. | |
| 2006/0256130 A1 | 11/2006 | Gonzalez | |
| 2007/0240171 A1 | 10/2007 | Biro et al. | |
| 2009/0241135 A1 | 9/2009 | Wong et al. | |
| 2009/0254912 A1* | 10/2009 | Roundtree | G06F 8/61 718/102 |
| 2010/0174974 A1* | 7/2010 | Brisebois | G06F 17/243 715/223 |
| 2011/0093815 A1 | 4/2011 | Gobeil | |
| 2011/0113453 A1 | 5/2011 | Ralston et al. | |
| 2012/0047426 A1 | 2/2012 | Hauser | |

(Continued)

FOREIGN PATENT DOCUMENTS

WO   WO 2012/148867   11/2012

OTHER PUBLICATIONS

"Native, web, or hybrid mobile-app development"—IBM, Apr. 2012 ftp://public.dhe.ibm.com/software/pdf/mobile-enterprise/WSW14182USEN.pdf.*

(Continued)

*Primary Examiner* — Randy Scott
(74) *Attorney, Agent, or Firm* — Mahamedi Paradice LLP

(57) ABSTRACT

Methods, systems, and apparatus, including computer programs encoded on computer storage media, for dynamic rendering for hybrid apps. One of the methods includes receiving user input navigating to a first view of an application; determining, using a navigation hierarchy stored on the mobile device, to render the first view using a native rendering engine native to the mobile device; receiving an update to the navigation hierarchy from a server; after receiving the update, receiving user input navigating to the first view; and determining, using the update to the navigation hierarchy from the server, to render the first view using an open rendering engine that is not native to the mobile device.

20 Claims, 4 Drawing Sheets

(56) References Cited

U.S. PATENT DOCUMENTS

2012/0060142 A1 3/2012 Fliess et al.
2012/0089950 A1 4/2012 Tseng

OTHER PUBLICATIONS

International Search Report and Written Opinion in International Application No. PCT/CA2014/050447, mailed Aug. 6, 2014, 8 pages.

"Native, web or hybrid mobile-app development," IBM Corporation, Apr. 2012, retrieved on Jun. 25, 2014, http://public/dhe.ibm.com/software/in/events/softwareuniverse/resources/Native_web_or_hybrid_mobile_app_development.pdf, 12 pages.

"Salesforce Touch Platform Mobile Development Guide," Salesforce.com, 2000-2012, retrieved on May 29, 2014, http://media.developerforce.com/pdfs/salesforce_touch_platform.pdf, 87pages.

* cited by examiner

DYNAMIC RENDERING FOR SOFTWARE APPLICATIONS

BACKGROUND

This specification relates to mobile devices and the associated applications ("apps") on those devices and, in particular, to dynamic rendering for hybrid apps.

In a world that is increasingly social and open, mobile apps play a vital role, and have changed the focus from what's on the Web, to the apps on the mobile device. Increased availability and falling prices have helped in the fast adoption rate of mobile devices, which in turn has made apps an increasingly popular phenomenon. Whether these apps are for productivity or entertainment, there are huge amounts of profits associated with them. Thus companies are vying to get into this space fast to claim their share of the market. There are a few different types of apps: for example native apps, web apps and hybrid apps.

Native apps are specific to a given mobile platform (iOS or Android) using the development tools and language that the respective platform supports (e.g., Xcode and Objective-C with iOS, Eclipse and Java with Android). Native apps are usually developed using an integrated development environment (IDE). IDEs provide tools for building debugging, project management, version control, and other tools. Native apps can take advantage of the built-in hardware (camera, calendar, geolocation, etc.) of the mobile devices and also look and perform the best.

Web (HTML5) apps use standard web technologies—typically HTML5, JavaScript and CSS. This write-once-run-anywhere approach to mobile development creates cross-platform mobile applications that work on multiple devices. An HTML5 mobile app is basically a web page, or series of web pages, that are designed to work on a limited screen size of a mobile device. HTML5 apps are device agnostic and can be opened with a browser available on a mobile device. Such apps have limitations for example session management, secure offline storage, and access to native device functionality (camera, calendar, geolocation, etc.) Web apps are generalized for multiple platforms and not installed locally but made available over the Internet through a browser.

Hybrid apps make it possible to embed HTML5 apps inside a thin native container, combining elements of native and HTML5 apps. Hybrid apps can be built using a mix of native and web technologies and is becoming an increasingly viable option. Usually split on a feature basis, these app can benefit from faster-to-build HTML components, reuse between platforms, or even seamless updates bypassing the approval processes while still maintaining a high-end user experience. Hybrid application can: function even when the device is not connected; be integrated with a device's file system; be integrated with Web-based services; have improved access to dynamic online content via the embedded browser. Nonetheless, when compared with native apps, hybrid apps typically sacrifice some level user-experience or functionality for the advantage of being cross-platform.

SUMMARY

This specification describes a method for rendering an application using a view structure that specifies whether various views of the application are rendered using native tools or open tools. The application checks a server at run time to see if the current view structure has been updated.

In general, one innovative aspect of the subject matter described in this specification can be embodied in methods that include the actions of receiving user input navigating to a first view of an application executing on a mobile device; determining, using a navigation hierarchy stored on the mobile device, to render the first view using a native rendering engine native to the mobile device; receiving an update to the navigation hierarchy from a server; after receiving the update, receiving user input navigating to the first view; and determining, using the update to the navigation hierarchy from the server, to render the first view using an open rendering engine that is not native to the mobile device. Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The foregoing and other embodiments can each optionally include one or more of the following features, alone or in combination. the application is a hybrid application configured to render a plurality of views using either the native rendering engine or a web-based rendering engine, and wherein determining to render the first view using an open rendering engine comprises determining to render the first view using the web-based rendering engine. Receiving the update to the navigation hierarchy comprises checking for a possible update in response to launching the application. Receiving the update to the navigation hierarchy comprises checking for a possible update in response to using an application programming interface (API) in executing the application. Receiving the update to the navigation hierarchy comprises sending a query to the server for the update and receiving the update from the server in response to the query. Receiving the update to the navigation hierarchy comprises receiving a push notification from the server with the update. The navigation hierarchy is stored in a config file or a .properties file. The actions include using the open rendering engine to fetch page view content from the server before rendering the first view using the open rendering engine. The actions include using a scripting engine to fetch and construct page view content from the server before rendering the first view using the open rendering engine. The actions include using the native rendering engine to fetch and construct page view content before rendering the first view using the open rendering engine Particular embodiments of the subject matter described in this specification can be implemented to realize one or more advantages. Apps can be kept "fresh" with new features, flows, animations and transitions using dynamic rendering. Dynamic rendering enables quick changes in user experience and content without requiring a new app to be released, while maintaining the overall performance advantage over hybrid and web apps. Apps can be segmented, e.g., by user location or other factors. Dynamic navigation view structures can be pushed or pulled from a remote server.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTIONS OF DRAWINGS

Like reference numbers and designations in the various drawings indicate like elements.

DETAILED DESCRIPTION

Figure 1:
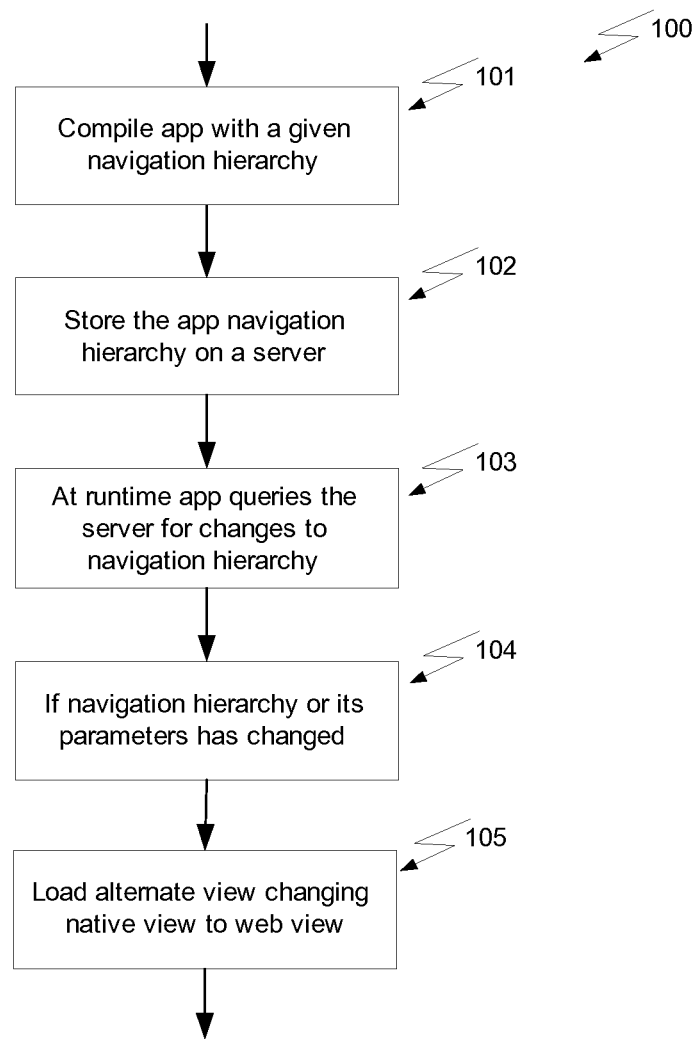
FIG. 1 is a flow diagram of an example method for rendering views of an app.

Some hybrid app containers have static regions where they either render a web view (HTML) or a native view. These regions are decided at compile time and typically cannot be changed once the compiled version is launched. Keeping an app updated with new features can be a key factor in keeping app users engaged, but apps can be expensive to update, and it takes time to test and release new versions of an app via the App stores. The systems and methods described in this specification can address these concerns by providing a dynamic rendering method whereby a native view can be changed to a web view at runtime.

Keeping an app "fresh" with new features, flows, animations and transitions can be a key factor in keeping application users engaged. Dynamic rendering enables quick changes in user experience and content without requiring a new app to be released, while maintaining the overall performance advantage over hybrid and web apps. It creates a new form of application that combines the flexibility and dynamic content update of hybrid apps with the richer user experience and higher performance of native apps.

The systems and methods described in this specification can provide a dynamic method to change the native views to web views after the app has been compiled. This provides ongoing and increased flexibility in terms of being able to change the views after the app is compiled and installed on a mobile device.

In some examples, an app can dynamically switch from a native view to a web view. In some examples, each time an app is launched it checks against a server for the app configuration and then loads the views accordingly switching from native to web views where needed. In some examples, the app views can be configured and changed on the fly by only changing the configuration on the server; and the app upon launch checks against the server and loads the views as per the new configuration.

In some examples, the server can capture analytics on usage and optimal app configuration. In some examples, a software developer can use a graphical user interface to map and configure the server navigation hierarchy update.

In some examples, apps can be segmented based on user location. In some examples, app segmentation can be done based on operating system, market, paid vs. free, device size, model, screen resolution etc. In some examples A-B (or multiple A-B) testing can be done using different configurations for different customer segments.

In some examples app version fragmentation can be dealt with using the methods and systems described. In some examples, version fragmentation occurs when two versions of an app expect different structures of server-side data needed to render views. In some examples, the newer version typically has the object code needed to parse and render this data in the app while an older version does not. In some examples, the method and systems described can configure the older version of the app at runtime to switch affected views to web views. The web views can render data more dynamically without a need to update the entire app to a new version.

In some examples the new or changed configuration can be pushed to the app on a real-time basis when changes to the configuration are made. In some examples the app pulls the changes to the configuration upon launch. In some examples upon each use of an API, the app checks the server for any new configurations.

In addition to being able to change the native views to HTML views at runtime, the system and methods described in this specification can also offer different rendering schemes for the same app based on the regions, location, device make and model, user location, profile, demographic segmentation, social graph, etc. Thus different locations may have different rendering schemes for the same app. In some examples the switch may happen between native views or hybrid views to an open rendering-engine views like OpenGL or other proprietary rendering engines, e.g. the views may switch between a native view and an OpenGL view.

The system and methods described in this specification can provide dynamic rendering that enables new ways to configure an app on the fly, creating engaging user experiences.

FIG. 1 is a flow diagram of an example method 100 for rendering views of an app. The method can be performed, for example, by a combination of a software developer creating the app and a user executing the app.

The app is compiled 101 with a given navigation hierarchy. The software developer can develop the navigation hierarchy with the app and compile the app using a software development kit for a target device or operating system or both. The target device can be an iPhone, iPad, Smartphones, Android phones, personal computers e.g. laptops, tablet computers, touch-screen computers running any number of different operating systems e.g. MS Windows, Apple iOS, Google Android, Linux, Ubuntu, and so on.

In some implementations, the device has a touch-sensitive display with a graphical user interface (GUI), one or more processors, memory and one or more modules, programs or sets of instructions stored in the memory for performing multiple functions. In some embodiments, the user interacts with the GUI primarily through finger contacts and gestures on the touch-sensitive display. In some implementations, the functions may include providing maps and directions, telephoning, video conferencing, e-mailing, instant messaging, blogging, digital photographing, digital videoing, web browsing, digital music playing, and/or digital video playing. Instructions for performing these functions may be included in a computer readable storage medium or other computer program product configured for execution by one or more processors.

In developing the navigation hierarchy, the software developer creates views for the application and decides whether certain app views are appropriate for a native view or for a web view. A view can be a window, screen, or other user interface element that is displayed for a user during execution of the application. The navigation hierarchy can be expressed as a graph (e.g., as described further below with reference to FIG. 3) and stored in any appropriate data structure.

The software developer stores 102 the app navigation hierarchy on a server. For example, the navigation hierarchy can be stored on the server as a configuration file. The app navigation hierarchy can be a file with certain parameters and values, where the values define the behavior of the app. The server is configured to provide the navigation hierarchy to the app, e.g., over the Internet. The server can provide the navigation hierarchy in response to a query.

At runtime, i.e., when a user has installed the app and executes the app, the app queries 103 the server for changes to the navigation hierarchy. The server can respond by sending the navigation hierarchy to the device, or sending changes to the navigation hierarchy, e.g., from a certain date or state in a revision history.

In some implementations, the app compares a configuration file stored on the device with the configuration file that is stored on the server. If the navigation hierarchy or its parameters have changed 104, then the app loads 105 an alternate view, e.g., by changing a native view to a web view. For example, the app can update the configuration file stored on the device, so that when the user navigates to a view that has been updated, the app renders the view according to the update.

Figure 2:
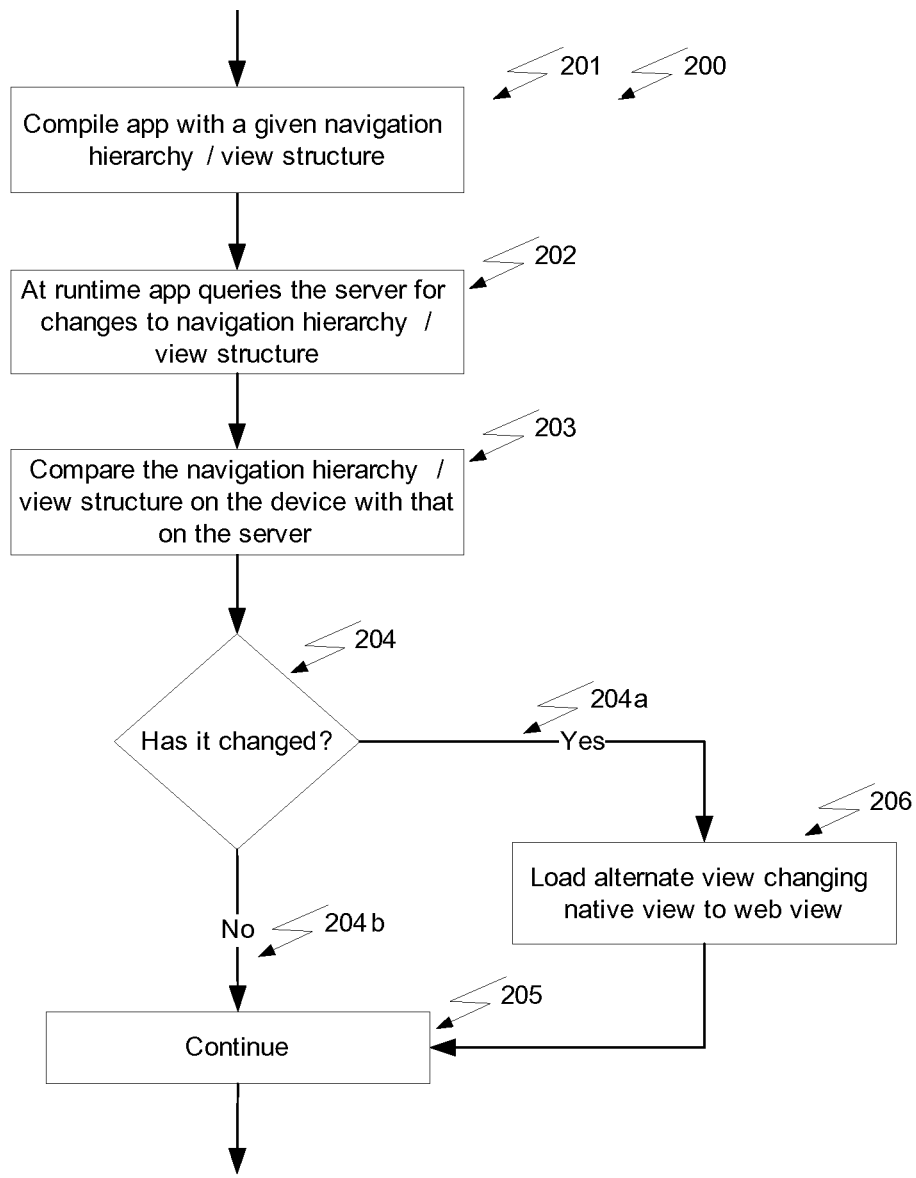
FIG. 2 is a flow diagram of an example method for rendering views of an app.

FIG. 2 is a flow diagram of an example method 200 for rendering views of an app. The method can be performed, for example, by a combination of a software developer creating the app and a user executing the app.

The software developer compiles 201 the app with a given navigation hierarchy/view structure, e.g., as described above with reference to FIG. 1, and stores the navigation hierarchy on a server. At runtime, a user executes the app on a device, and the app queries 202 the server for changes to the navigation hierarchy/view structure, e.g., as described above with reference to FIG. 1. The app compares 203 a navigation hierarchy/view structure stored on the device with the navigation hierarchy/view structure received from the server.

If the navigation hierarchy/view structure on the server is different from the navigation hierarchy/view structure on the device 204, then 204*a* the app loads 206 an alternative view, e.g., changing a native view to a web view. If not, then 204*b* the app continues 205 by using the navigation hierarchy/view structure on the device.

An app can be enabled to switch between a native view and a web view in several different ways. For example, the app can execute a software entity configured for handling both fetching the data and deciding which view (native or web view) will be displayed. In another example, the app can execute several entities configured for handling various parts of the system. One of those entities can be configured for fetching data while another one of the entities is configured for decided which view (native or web view) will be displayed.

An app can render web view content using any appropriate technique. For example, the device executing the app can have the web view fetch the page contents (e.g., from a uniform resource locator (URL)) that have been constructed on the server, before the app renders the page contents on the web view. In another example, the device can utilize a scripting engine to fetch and construct the page contents, before the app renders the page contents on the web view. In another example, the device can fetch and construct the page contents in native code, before the app renders the page contents on the web view.

Figure 3:
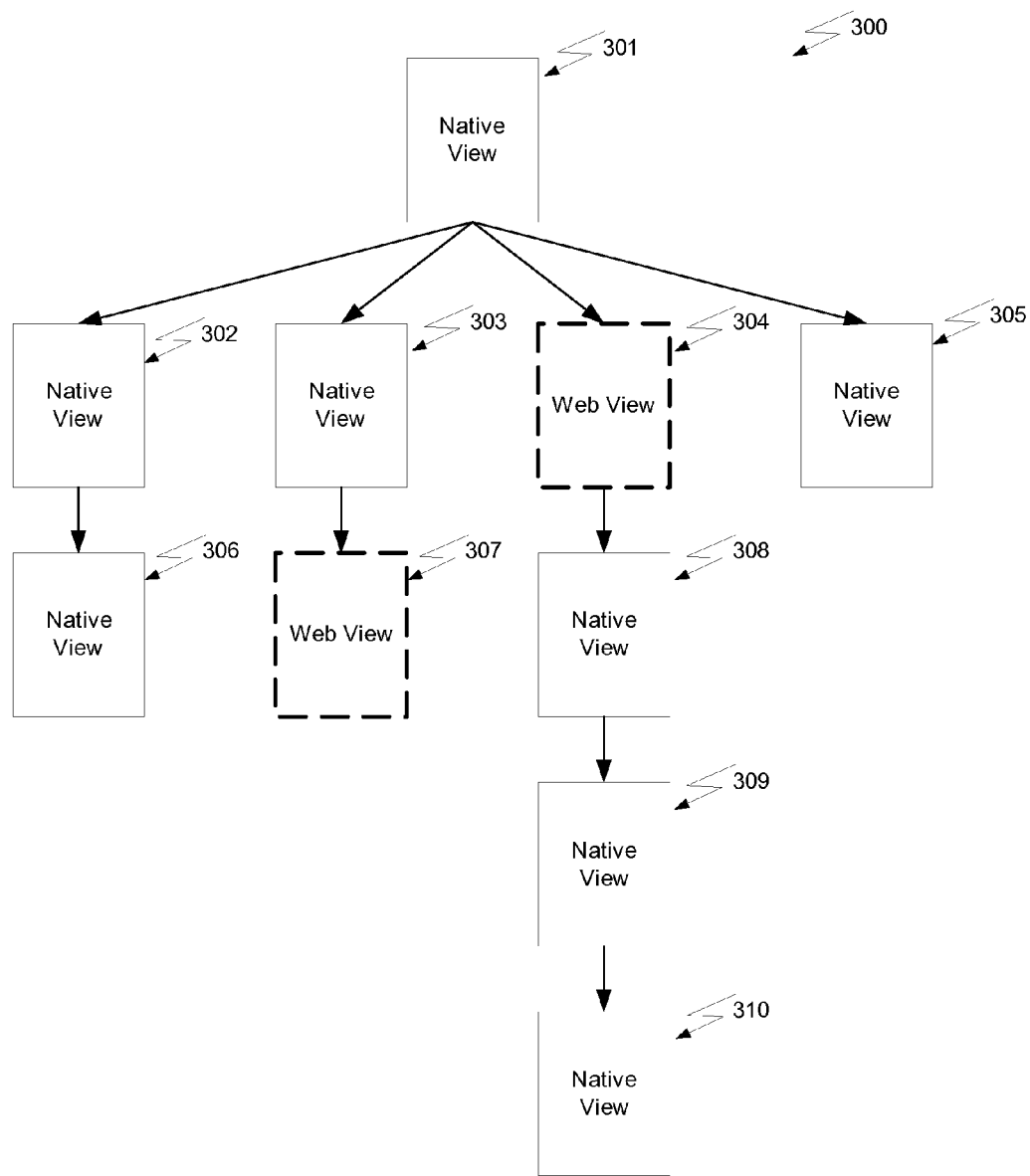
FIG. 3 is a diagram illustrating an example navigation hierarchy/view structure expressed as a graph.

FIG. 3 is a diagram illustrating an example navigation hierarchy/view structure expressed as a graph 300. The graph shows various views of an app. From a given view, a user can navigate to other views as illustrated by arrows between the views. Native views are illustrated in a box of solid lines and web views are illustrated in a box of dashed lines. Thus if the navigation hierarchy/view structure is stored on a device with the app, then views 301, 302, 303, 305, 306, 308, 309 and 310 will be rendered as native views. Views 304 and 307 will be rendered as web views.

Figure 4:
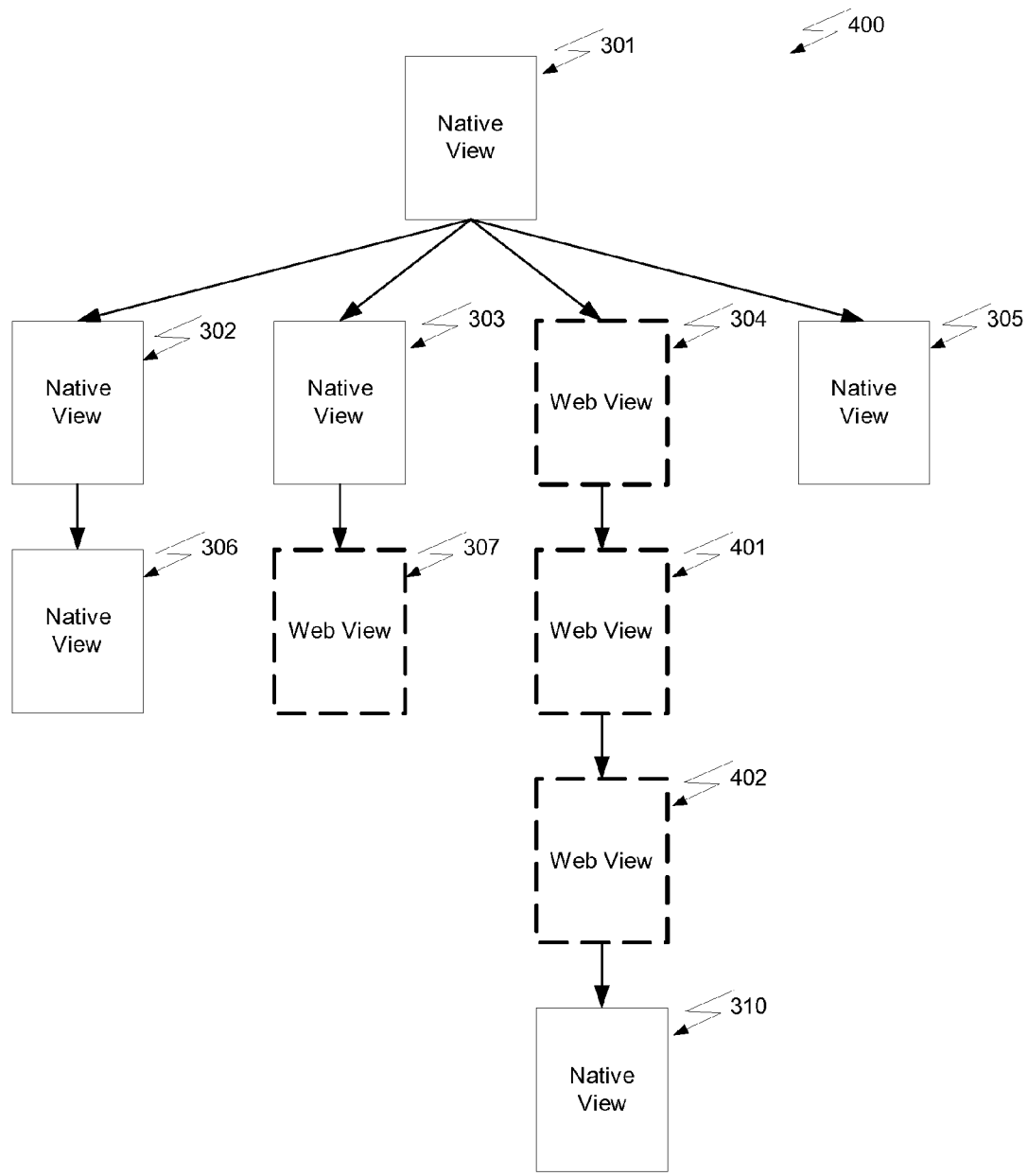
FIG. 4 is a diagram illustrating the example navigation hierarchy/view structure after an update expressed as a graph.

FIG. 4 is a diagram illustrating the example navigation hierarchy/view structure after an update expressed as a graph 400. To illustrate the update, consider an example scenario where a device has the example navigation hierarchy of FIG. 3 stored locally and, at runtime, the app receives the example navigation hierarchy of FIG. 4 from the server.

When the app queries the server to check which views have changed, by comparing the two navigation hierarchies the app can determine that view 308 has changed to view 401 and that view 309 has changed to view 402. Those views are now web views instead of native views. Thus when rendering views 401 and 402, the app will render those views as web views, whereas, prior to receiving the updated navigation hierarchy/view structure, the app would have rendered those views as native views. The app can continue to render the other views as they were rendered prior to the update.

In some implementations, the server can execute a server side app view management service. Thus a "config file" is stored on a server that is accessible by the app over the internet, and at runtime the app checks for the configuration of views against this "config file." If the "config file" on the server has been changed, the app switches the changed views from native view to web view.

In some implementations, the server pushes the "config file" to the app. In some implementations, the server pushes a notification to the app that triggers the app to pull the "config file" from the server.

In some implementations, an application programming interface (API) is associated with the app and the server may only push the changes to the API rather than sending the entire "config file." In some implementations, the server or the app or both store unique identifiers (IDs) for each view. When a view has changed from native view to a web view, the app at runtime queries the server to check which IDs have changed. If any IDs have changed then the app switches the requisite screens from a native view to a web view for these IDs.

In some implementations, the server stores a ".properties file" to store the navigation hierarchy. In some implementations, if there are too many values to be stored using conventional config files or .properties files, the server can alternatively or additionally use a database for storing values.

In some implementations, the app at runtime can compare the versions of the config file on the server and the device. If the config file on the server side is newer than the config file on the device, then the app can replace the entire config file on the device with the config file from the server and render the views as per the new config file.

Although some parts of this specification refer to example rendering engines, i.e., the native and hybrid and web engines, the methods and systems described in this specification can be used with other rendering engines. For example, an app can switch between native views or hybrid views to an open rendering engine's views, e.g., Open Graphics Library (OpenGL) or other proprietary rendering engines. So, the app can switch between a native view and an OpenGL view.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. For example, the subject matter is described in context of scientific papers. The subject matter can apply to other indexed work that adds depth aspect to a search. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing can be advantageous.

What is claimed is:

1. A method performed by an application executing on a mobile device, the method comprising:

receiving user input navigating to a first view of the application;

determining, using a navigation hierarchy stored on the mobile device, to render the first view using a native rendering engine native to the mobile device;

receiving an update to the navigation hierarchy from a server;

after receiving the update, receiving user input navigating to the first view; and determining, using the update to the navigation hierarchy from the server, to render the first view using an open rendering engine that is not native to the mobile device.

2. The method of claim 1, wherein the application is a hybrid application configured to render a plurality of views using either the native rendering engine or a web-based rendering engine, and wherein determining to render the first view using an open rendering engine comprises determining to render the first view using the web-based rendering engine.

3. The method of claim 1, wherein receiving the update to the navigation hierarchy comprises checking for a possible update in response to launching the application.

4. The method of claim 1, wherein receiving the update to the navigation hierarchy comprises checking for a possible update in response to using an application programming interface (API) in executing the application.

5. The method of claim 1, wherein receiving the update to the navigation hierarchy comprises sending a query to the server for the update and receiving the update from the server in response to the query.

6. The method of claim 1, wherein receiving the update to the navigation hierarchy comprises receiving a push notification from the server with the update.

7. The method of claim 1, wherein the navigation hierarchy is stored in a config file or a .properties file.

8. The method of claim 1, comprising using the open rendering engine to fetch page view content from the server before rendering the first view using the open rendering engine.

9. The method of claim 1, comprising using a scripting engine to fetch and construct page view content from the server before rendering the first view using the open rendering engine.

10. The method of claim 1, comprising using the native rendering engine to fetch and construct page view content before rendering the first view using the open rendering engine.

11. A mobile device comprising a processor and memory storing instructions that, when executed by the processor, cause the processor to perform operations comprising:

receiving user input navigating to a first view of an application executing on the mobile device;

determining, using a navigation hierarchy stored on the mobile device, to render the first view using a native rendering engine native to the mobile device;

receiving an update to the navigation hierarchy from a server;

after receiving the update, receiving user input navigating to the first view; and determining, using the update to the navigation hierarchy from the server, to render the first view using an open rendering engine that is not native to the mobile device.

12. The mobile device of claim 11, wherein the application is a hybrid application configured to render a plurality of views using either the native rendering engine or a web-based rendering engine, and wherein determining to render the first view using an open rendering engine comprises determining to render the first view using the web-based rendering engine.

13. The mobile device of claim 11, wherein receiving the update to the navigation hierarchy comprises checking for a possible update in response to launching the application.

14. The mobile device of claim 11, wherein receiving the update to the navigation hierarchy comprises checking for a possible update in response to using an application programming interface (API) in executing the application.

15. The mobile device of claim 11, wherein receiving the update to the navigation hierarchy comprises sending a query to the server for the update and receiving the update from the server in response to the query.

16. The mobile device of claim 11, wherein receiving the update to the navigation hierarchy comprises receiving a push notification from the server with the update.

17. The mobile device of claim 11, wherein the navigation hierarchy is stored in a config file or a .properties file.

18. The mobile device of claim 11, comprising using the open rendering engine to fetch page view content from the server before rendering the first view using the open rendering engine.

19. The mobile device of claim 11, comprising using a scripting engine to fetch and construct page view content from the server before rendering the first view using the open rendering engine.

20. The mobile device of claim 11, comprising using the native rendering engine to fetch and construct page view content before rendering the first view using the open rendering engine.

* * * * *